(12) United States Patent
McBride et al.

(10) Patent No.: US 12,440,874 B2
(45) Date of Patent: *Oct. 14, 2025

(54) SENSOR SYSTEM HAVING TRANSPARENT WINDOW CONTAMINANT REMOVAL USING VIBRATION

(71) Applicant: Tyco Fire & Security GmbH, Neuhausen am Rheinfall (CH)

(72) Inventors: Frederick Michael McBride, Belfast (GB); Timothy Harrison, Belfast (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,863

(22) Filed: Sep. 11, 2023

(65) Prior Publication Data

US 2024/0082889 A1 Mar. 14, 2024

Related U.S. Application Data

(63) Continuation of application No. 17/743,004, filed on May 12, 2022, now Pat. No. 11,752,531, and a
(Continued)

(51) Int. Cl.
*B08B 7/02* (2006.01)
*B08B 11/04* (2006.01)
(Continued)

(52) U.S. Cl.
CPC .............. *B08B 7/028* (2013.01); *B08B 11/04* (2013.01); *G01N 21/94* (2013.01); *G06T 7/0002* (2013.01);
(Continued)

(58) Field of Classification Search
CPC ..... B08B 7/028; B08B 11/04; H04N 5/23299; H04N 5/2252; G01N 21/94; G06T 7/0002
See application file for complete search history.

(56) References Cited

U.S. PATENT DOCUMENTS

2007/0195195 A1 8/2007 Onuki
2015/0298657 A1* 10/2015 Kanter .................. B60S 1/0848
348/148
(Continued)

FOREIGN PATENT DOCUMENTS

CN 204669498 U 9/2015

OTHER PUBLICATIONS

Extended European Search Report issued in corresponding European Application No. EP24150117 dated Apr. 5, 2024.

*Primary Examiner* — Hesham K Abouzahra
(74) *Attorney, Agent, or Firm* — ArentFox Schiff LLP

(57) ABSTRACT

A sensor system includes: a housing having an internal wall defining an opening; a transparent window mounted within the opening; a sensor device within the housing and having at least one of a sensor output or a sensor input alignable with the transparent window; a vibration device in communication with the transparent window, where the vibration device is controllable to produce a first sonic movement; where the transparent window is movably responsive to the first sonic movement with a second sonic movement; and at least one damping member located between the transparent window and the sensor device, where the damping member substantially isolates the sensor device from at least the second sonic movement of the transparent window. A method includes determining a cleaning trigger corresponding to cleaning the transparent window; and controlling, in response to the cleaning trigger, a vibration frequency, amplitude, or duration of the vibration device.

18 Claims, 8 Drawing Sheets

Related U.S. Application Data continuation of application No. 16/252,287, filed on Jan. 18, 2019, now Pat. No. 11,358,184.

(51) Int. Cl.
  *G01N 21/94* (2006.01)
  *G06T 7/00* (2017.01)
  *H04N 17/00* (2006.01)
  *H04N 23/51* (2023.01)
  *H04N 23/695* (2023.01)

(52) U.S. Cl.
  CPC ........... *H04N 17/002* (2013.01); *H04N 23/51* (2023.01); *H04N 23/695* (2023.01); *G06T 2207/30168* (2013.01)

(56) References Cited

U.S. PATENT DOCUMENTS

| | | | |
|---|---|---|---|
| 2016/0272165 A1* | 9/2016 | Hsiao | G02B 27/0006 |
| 2017/0371154 A1 | 12/2017 | Fedigan et al. | |
| 2018/0154406 A1* | 6/2018 | Magee | G02B 27/0006 |

\* cited by examiner

SENSOR SYSTEM HAVING TRANSPARENT WINDOW CONTAMINANT REMOVAL USING VIBRATION

CROSS REFERENCE TO RELATED APPLICATION(S)

This application is a Continuation of U.S. application Ser. No. 17/743,004, entitled "SENSOR SYSTEM HAVING TRANSPARENT WINDOW CONTAMINANT REMOVAL USING VIBRATION" and filed on May 12, 2022, which is a continuation of U.S. application Ser. No. 16/252,287, entitled "SENSOR SYSTEM HAVING TRANSPARENT WINDOW CONTAMINANT REMOVAL USING VIBRATION" and filed on Jan. 18, 2019, the contents of all of which are expressly incorporated by reference herein in their entireties.

BACKGROUND

The present disclosure relates generally to surveillance devices, and in particular, to maintenance of surveillance devices. Sensor systems include sensor devices mounted within housings through which sensor signals are transmitted and/or received. For example, an outdoor fixed or pan-tilt-zoom (PTZ) camera housing may include an enclosing transparent bubble that provides optical clarity and environmental protection for a camera assembly within the housing. However, the enclosing transparent bubble may limit the achievable resolution and optical clarity of a PTZ camera, especially when covered with contaminants. Accordingly, improved sensor systems are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, for example, the present disclosure includes a sensor system including: a housing having at least one internal wall defining an opening; a transparent window mounted within the opening; a sensor device positionable within the housing and having at least one of a sensor output or a sensor input alignable with the transparent window; a vibration device in communication with the transparent window, where the vibration device is controllable to produce a first sonic movement; where the transparent window is movably responsive to the first sonic movement with a second sonic movement; and at least one damping member located between the transparent window and the sensor device, where the at least one damping member substantially isolates the sensor device from at least the second sonic movement of the transparent window.

In a further aspect, the present disclosure includes a method including determining a cleaning trigger corresponding to cleaning a transparent window mounted within an opening defined by at least one internal wall of a housing of the sensor system; and controlling, in response to the cleaning trigger, at least one of a vibration frequency, a vibration amplitude, or a vibration duration of a vibration device of the sensor system, where the vibration device is in communication with the transparent window, where the controlling causes the vibration device to produce a first sonic movement that causes the transparent window to movably respond with a second sonic movement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods and apparatuses for cleaning a transparent window positioned in front of a sensor device in a sensor system, such as a camera block and lens assembly within a camera unit. For example, in some cases, the transparent window forms at least a portion of a housing of the sensor system. In an aspect, a vibration device such as an ultrasonic transducer is used to excite the transparent window, causing the transparent window to vibrate/resonate at a specific frequency with a given energy. The vibrations energize contaminants built up on the transparent window. In response to the energy transferred to the contaminants being sufficiently high, for example high enough to break the bond between the contaminants and the transparent window, the contaminants move off the surface of the transparent window. The vibrations may be tuned according to detected severity and/or type of contaminant build-up. One or more damping members may be used to isolate such vibrations from the camera block and lens assembly so as to be able to obtain stable imagery and to reduce mechanical stress to the camera block. By locally vibrating the transparent window, the present aspects remove contaminant build-up without requiring a lot of electrical power, without causing mechanical stress to other parts of the camera unit, and without manual intervention. Accordingly, consistently high-resolution imagery may be obtained through the cleaned transparent window.

Turning now to the figures, example aspects are depicted with reference to one or more components described herein, where components in dashed lines may be optional.

Figure 1:
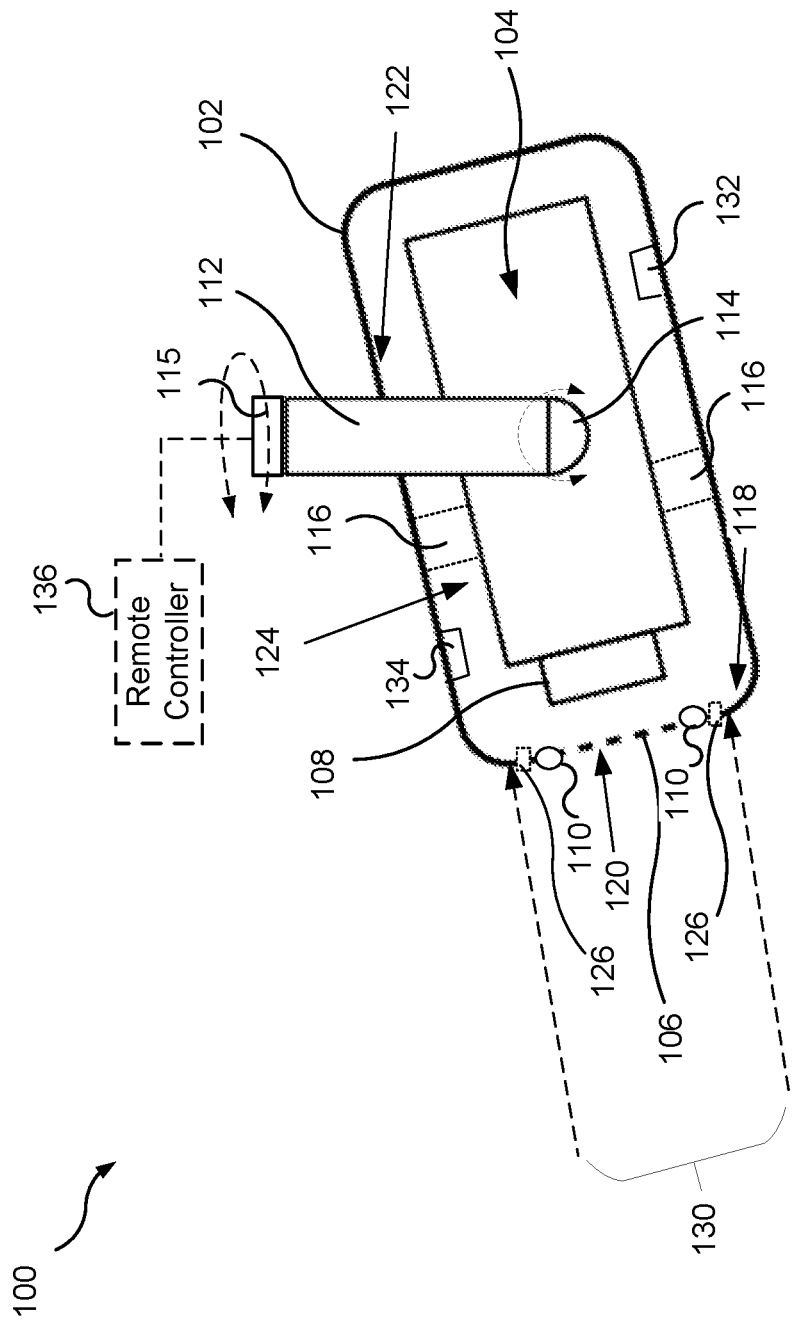
FIG. 1 is a schematic diagram of a partially cross-sectional side view of an example sensor system including a housing with a transparent window in front of a sensor device positioned within the sensor system.

Referring to FIG. 1, in one non-limiting aspect, a sensor system 100, which may be an outdoor pan-tilt-zoom (PTZ) camera, a fixed camera, a bullet camera, an infrared sensor, etc., includes a sensor device 104 fixedly or movably mounted within a housing 102. For example, the sensor device 104 may be a high-resolution camera block including a lens assembly 108 positioned such that a transparent window 106 configured within an opening 130 of the housing 102 is positioned immediately in front of the lens assembly 108. The transparent window 106 may be connected to the opening 130 and in contact with one or more vibration devices 110, such as one or more ultrasonic or electromagnetic vibration modules. In some cases, the transparent window 106 may be movably connected to the opening 130 via the one or more vibration devices 110 and/or by one or more damping members 126, while in other cases the transparent window 106 may be rigidly connected to the opening 130. The vibration devices 110 may include transducers that are excitable to cause a vibration of the transparent window 106 configured to energize and remove contaminant build-up on an outer surface 120 of the transparent window 106. The sensor system 100 may further include damping members 116 (between the housing 102 and the sensor device 104) and/or 126 (between the transparent window 106 and the housing 102) that mechanically isolate the sensor device 104 and/or the housing 102 from any vibrations of the vibration devices 110. Accordingly, for example, when the sensor device 104 is a high-resolution camera, stable imagery can be obtained even when the one or more vibration devices 110 are activated.

More specifically, in an aspect, the sensor system 100 may include one or more damping members 116 positionable between an inner wall 122 of the housing 102 and an outer surface 124 of the sensor device 104. In an aspect, for example, the damping members 116 may be an elastic mounting assembled on the inner wall 122 of the housing 102 and configured for mounting the sensor device 104 thereon. In an alternative and/or additional aspect, the transparent window 106 and/or the vibration devices 110 may also be adjoined to the opening 130 of the housing 102 via one or more damping members 126, which may be elastic dampers or other soft joining material such as foam or elastomer. Other suitable examples of damping members 116 and/or 126 include springs, rubber members, elastomeric members, mechanical and/or hydraulic shock absorbers, or any element or material capable of substantially isolating the vibration of the transparent window 106 from the sensor device 104 and/or from the housing 102.

In some aspects, for example, in a case where the sensor system 100 includes a movable sensor device 104 having a plurality of controllable positions, such as a PTZ camera, the housing 102 may be attached to a beam 112 by one or more sealed rotatable joints 114 (rotatable as indicated by a dashed line with arrowheads in FIG. 1) that allow for tilt movement (up and down in FIG. 1) of the housing 102. Additionally, the beam 112 may further include or be connected to one or more rotatable joints 115 (rotatable as indicated by a dashed line with arrowheads in FIG. 1) that allow for pan movement (in and out of the view of FIG. 1) of the housing 102, where the one or more rotatable joints 115 may be connected to a support structure. However, in some other aspects, for example, in a case where the sensor system 100 includes a fixed sensor device 104, such as a camera or infrared sensor, the housing 102 may be attached to the beam 112 in a fixed and/or manually-adjustable orientation, and the beam 112 may be attached to a support structure in a fixed and/or manually-adjustable orientation. In some optional implementations, the one or more rotatable joints 114, 115 may include or may be connected to a positioning devices, e.g., a motor or stepper device, which can be in wired and/or wireless communication with an optional remote controller 136, such as a computer device programmed to allow an operator to provide control signals to the positioning devices to control a position and/or orientation of the sensor device 104.

In some aspects, the transparent window 106 may be a planar window made from a transparent material such as glass or plastic. When made of glass, the transparent window 106 may be specified in different grades of glass and/or with different optical coatings. In some cases, the transparent window 106 may be exposed to outdoor contaminants or particulates, such as rain, wind, snow, ice, condensation, sand, exhaust fumes, soot, dust, etc., and/or indoor contaminants such as dust or other materials in the environment. A build-up of such contaminants on the outer surface of the transparent window 106 over time may cause degradation of the quality of imagery obtained by the sensor system 100. Such degradation may occur over a relatively long period of time and may therefore be difficult to notice by an operator of the sensor system 100. The degradation effect may be worse when the sensor device includes image sensors with higher resolutions, where very small contaminants can cause distortion to images obtained. As such, in some present aspects, the vibration devices 110 can move the transparent window 106 in short bursts, e.g., between or at or above 10-20 kHz, to remove one or more of the aforementioned types of contaminants from the outer surface 120 of the transparent window 106. Specifically, for example, in oily environments such as topside offshore in the oil and gas industries, the vibration devices 110 may cause vibrations of the transparent window 106 that cause oil mist and sea water contamination to emulsify and detach from the outer surface of the transparent window 106.

Generally, although an outdoor camera may be manually cleaned, there is a cost associated with such manual cleaning and maintenance. Further, personnel access and safety at heights to reach the cameras may cause further issues. Some cameras rely on hydrophobic (water-repellent) or oleophobic (oil-repellent) coatings, which may be applied to a cover glass of a camera. However the chemical compounds of such coatings may have a negative environmental impact, may be unintentionally removed when touched, and/or may eventually break down, rendering them ineffective. A glass cover or window of a camera may also be heated to remove water and/or ice, but such heating may cause excessive power consumption and may also not be effective in removing other types of contaminants. Alternatively, a mechanical wiping mechanism may be used to clear contaminants from a glass cover or window of a camera, for example by moving a wiper or by rotating a glass bubble against a wiper. However, the motors of such wiping mechanisms and/or the wipers themselves may wear out. For example, rubber-based wiper blades eventually need replacing. Additionally, the surface cleaned by a wiper may be scratched/marked by contaminants that get caught between the wiper and the surface. Some cameras implement mechanical shaking mechanisms to shake the entire camera assembly to remove contaminants from a glass cover or window of the camera. However, such shaking may cause excessive wearing to the mechanical PTZ components of PTZ cameras and may reduce the operating life of the camera.

In contrast, the vibration devices 110 in the sensor system 100 may be configured to move/shake the transparent window 106 to remove contaminants from the transparent window 106, while the damping members 116 and/or 126 mechanically isolate such movement from the sensor device 104. Accordingly, the transparent window 106 can be cleaned without needing mechanical wipers which are costly and prone to wear and tear, and which may cause smearing of the transparent window 106. Compared to mechanical wipers, the vibration devices 110 may also have reduced power consumption and increased operating life. The operation of the vibration devices 110 may be controlled by a controller 132, which may receive contaminant build-up information from the sensor device 104 and/or from a dedicated contaminant build-up detection sensor 134, thus allowing for cleaning of the transparent window 106 without manual intervention. Further, based on information from the sensor device 104 and/or from a dedicated contaminant build-up detection sensor 134, the controller 132 may implement one of a plurality of different types of vibration to remove different types and/or quantities of contaminants. Additionally, unlike mechanical cleaning mechanisms that only move bigger particles/droplets and are dependent on camera orientation, the vibration devices 110 are operable to excite/remove smaller particles, irrespective of the orientation of the sensor system 100.

As compared to conventional mechanical shaking mechanisms that shake the entire camera assembly, the vibration devices 110 in combination with the damping members 116 and/or 126 of the sensor system 100 are configured such that most or all of the movement of the transparent window 106 is isolated from the sensor device 104, the rotatable joints 114 and 115, and/or the housing 102. Accordingly, the present aspects move a much smaller mass, are more efficient, and reduce the stress to the rotatable joints 114 and 115 and the pan and tilt drive of the sensor system 100. Moreover, since the movement is limited to the transparent window 106, the vibration devices 110 in the present aspects may operate at much higher frequencies, e.g., in the sonic/ultrasonic range such as 10-20 kHz. Hence, the present aspects are more efficient in removing various types and amounts of contaminant build-up, as compared to conventional mechanical shaking mechanisms that may operate in the order of 10-50 Hz. Yet further, substantially limiting the vibrations to the mass of the transparent window 106 results in much less power requirement for cleaning the transparent window 106. As such, the main power supply of the sensor system 100, e.g., through power over Ethernet (POE), POE+, POE++, etc., as defined by the Institute of Electrical and Electronics Engineers (IEEE) standards such as 802.3af, 802.3at, and 802.3bt, may be used to drive the vibration devices 110. This simplifies and reduces the cost of installation and cabling of the sensor system 100. Further, the lower power consumption of the cleaning functionality in the present aspects results in lower power dissipation within the sensor system 100, thereby requiring less thermal management of wasted energy inside the sensor system 100 which is typically sealed from the outside environment. This may result in reduced cost and design complexities associated with such thermal management, may require fewer parts in the sensor system 100, and may thus allow for reduced dimensions, weight, cost, and maintenance of the sensor system 100. Such reduced power waste within the sensor system 100 is even more significant in hot environments where the sensor system 100 may be more easily subject to overheating.

The present sensor system 100 may be used in a wide range of difficult environments, for example, to name a few, in motorway gantry and offshore locations, as well as in coastal locations with high levels of salt in the atmosphere. The present cleaning functionality is applicable, for example, to outdoor cameras such as closed-circuit television (CCTV) cameras, front door security cameras, etc.

Figure 3:
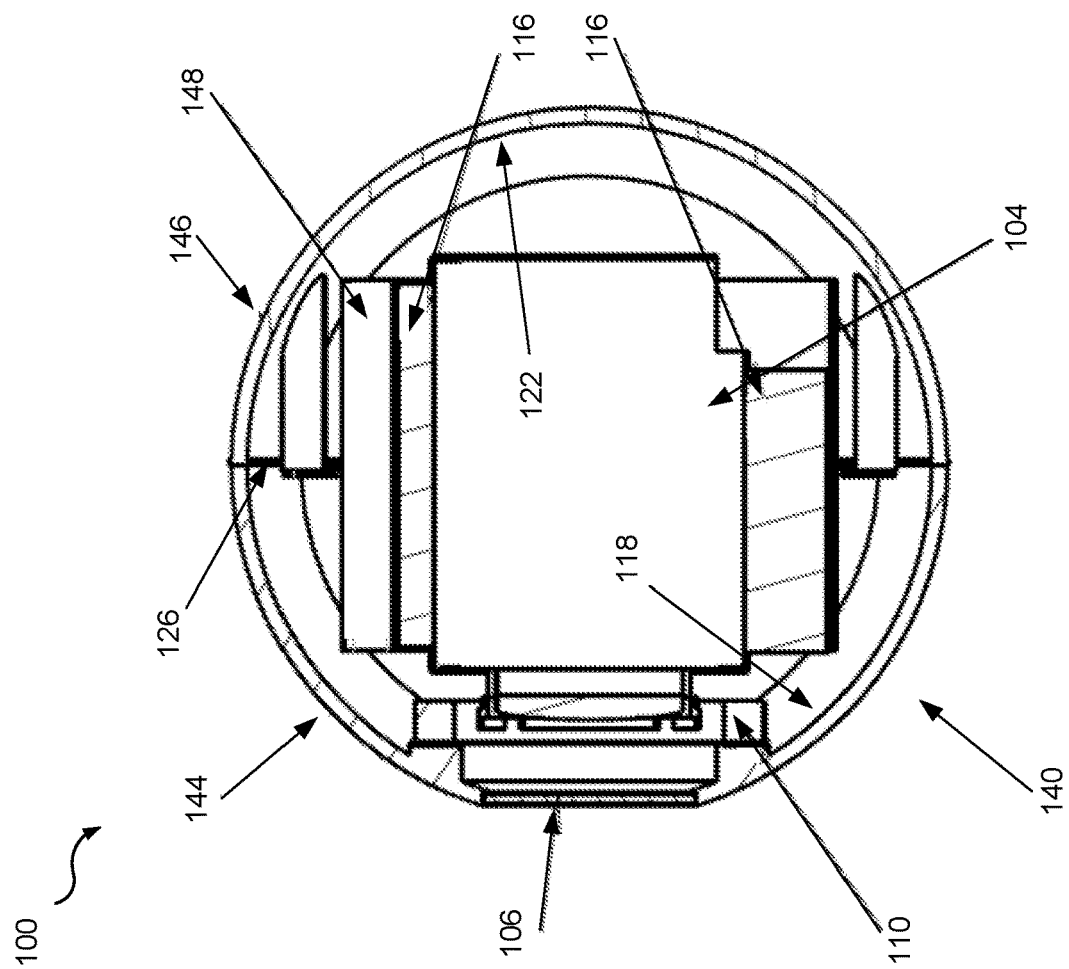
FIG. 3 is a cross-sectional view of the example implementation of FIG. 2 along line A-A of FIG. 2.
Figure 2:
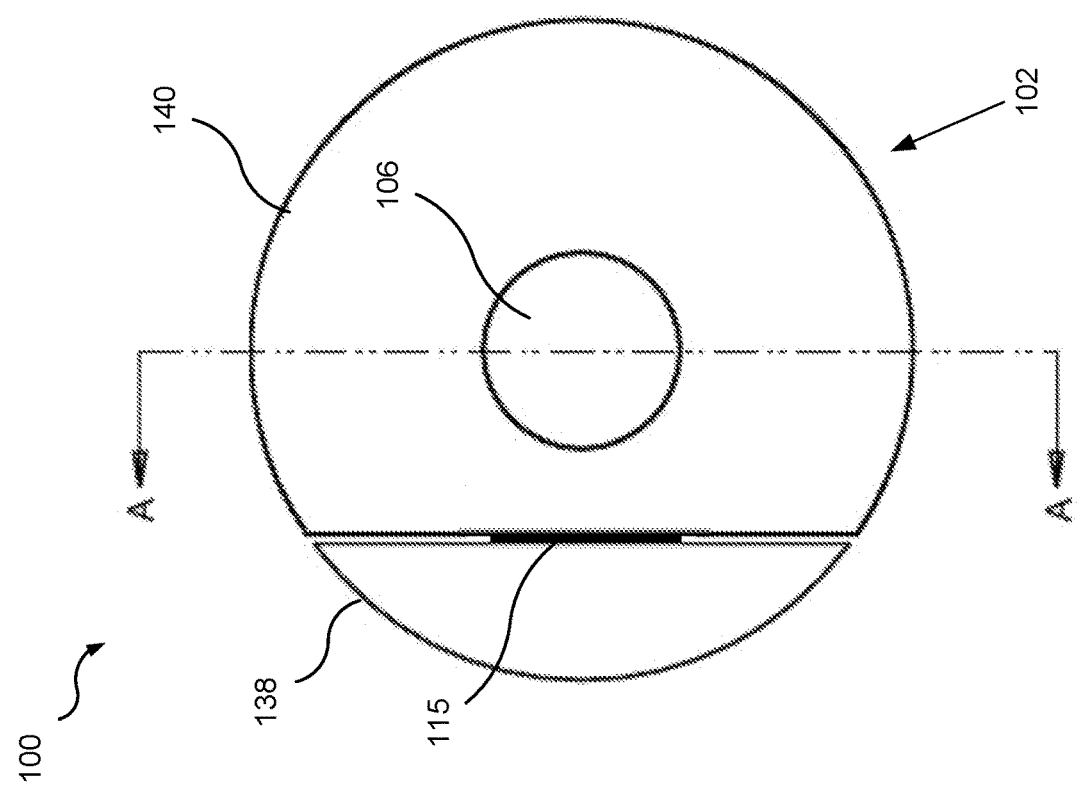
FIG. 2 is a front view of an example implementation of the sensor system of FIG. 1 configured as a ball-shaped outdoor pan-tilt-zoom (PTZ) camera.
Figure 4:
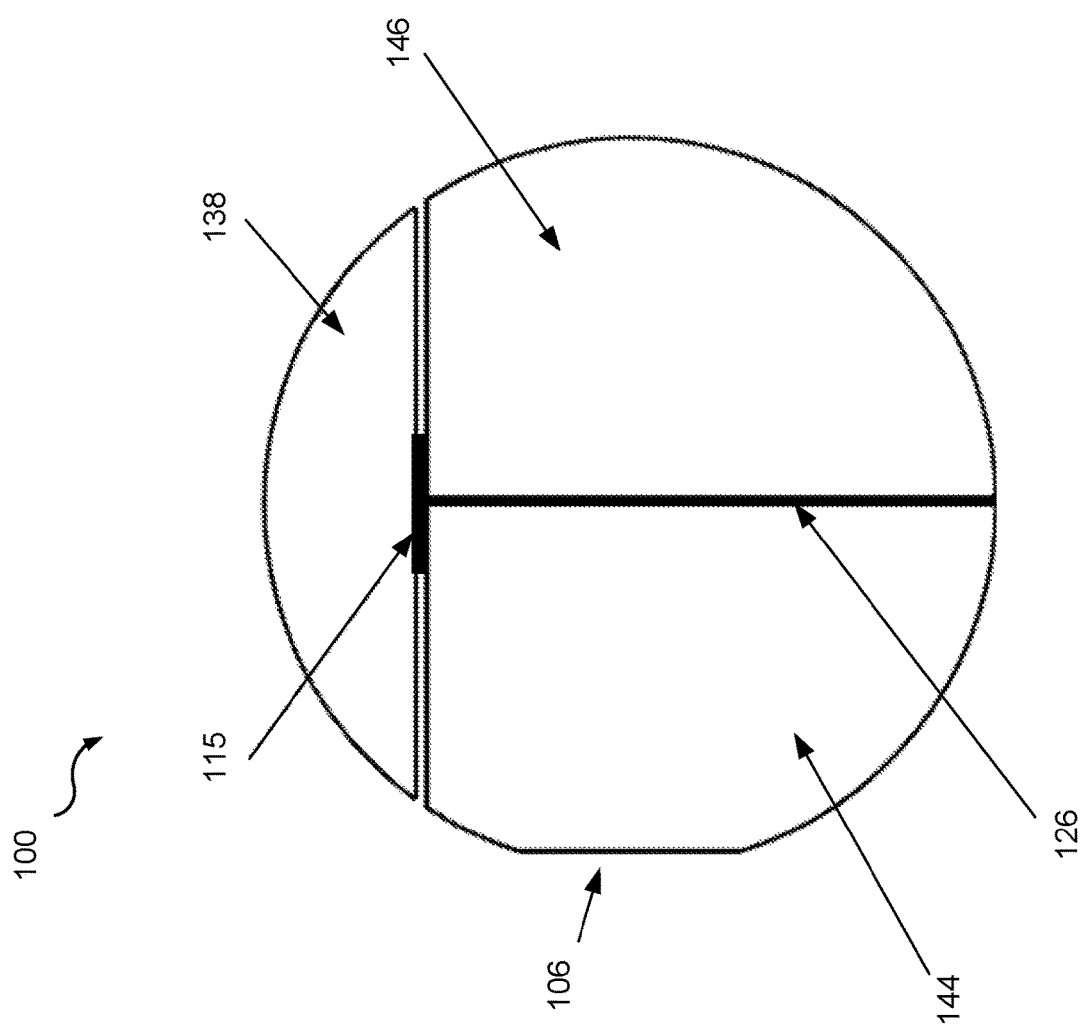
FIG. 4 is a side view of the example implementation of FIG. 2.

Referring to FIGS. 2-4 (where all of the referenced features are visible in FIG. 3, and FIGS. 2 and 4 providing supplementary views of select features), in one non-limiting implementation, the sensor system 100 may be a ball-shaped outdoor PTZ camera in which the housing 102 includes a pan mount section 138 attached by the rotatable joint 115 to a tilt mount housing 140. The rotatable joint 115 may be further configured as an environmental seal to protect the inside of the housing 102 against environmental contaminants. The tilt mount housing 140 itself includes a tilt housing front cover 144 and a tilt housing rear cover 146. The transparent window 106, which may be planar, is bonded to the tilt housing front cover 144. The sensor device 104, which is a camera in this case, is mounted on a mounting frame 148 attached to the inner wall 122 of the tilt housing rear cover 146. The sensor device 104 is at least partially vibrationally isolated by the damping members 116 from the mounting frame 148, and thereby from the tilt housing rear cover 146, and thereby from the tilt housing front cover 144. The vibration device 110, which may include an ultrasonic or electro-magnetic transducer, is bonded to the internal wall 118 of the tilt housing front cover 144 adjacent to the transparent window 106. The tilt housing front cover 144 may be attached to the tilt housing rear cover 146 by the damping member 126 configured to provide at least partial vibration isolation between the tilt housing front cover 144 and the tilt housing rear cover 146, thereby at least partially vibrationally isolating the vibration device 110 and the transparent window 106 from the sensor device 104. The damping member 126 may further be configured as an environmental seal to protect the inside of the housing 102 against environmental contaminants.

Figures 5, 6:
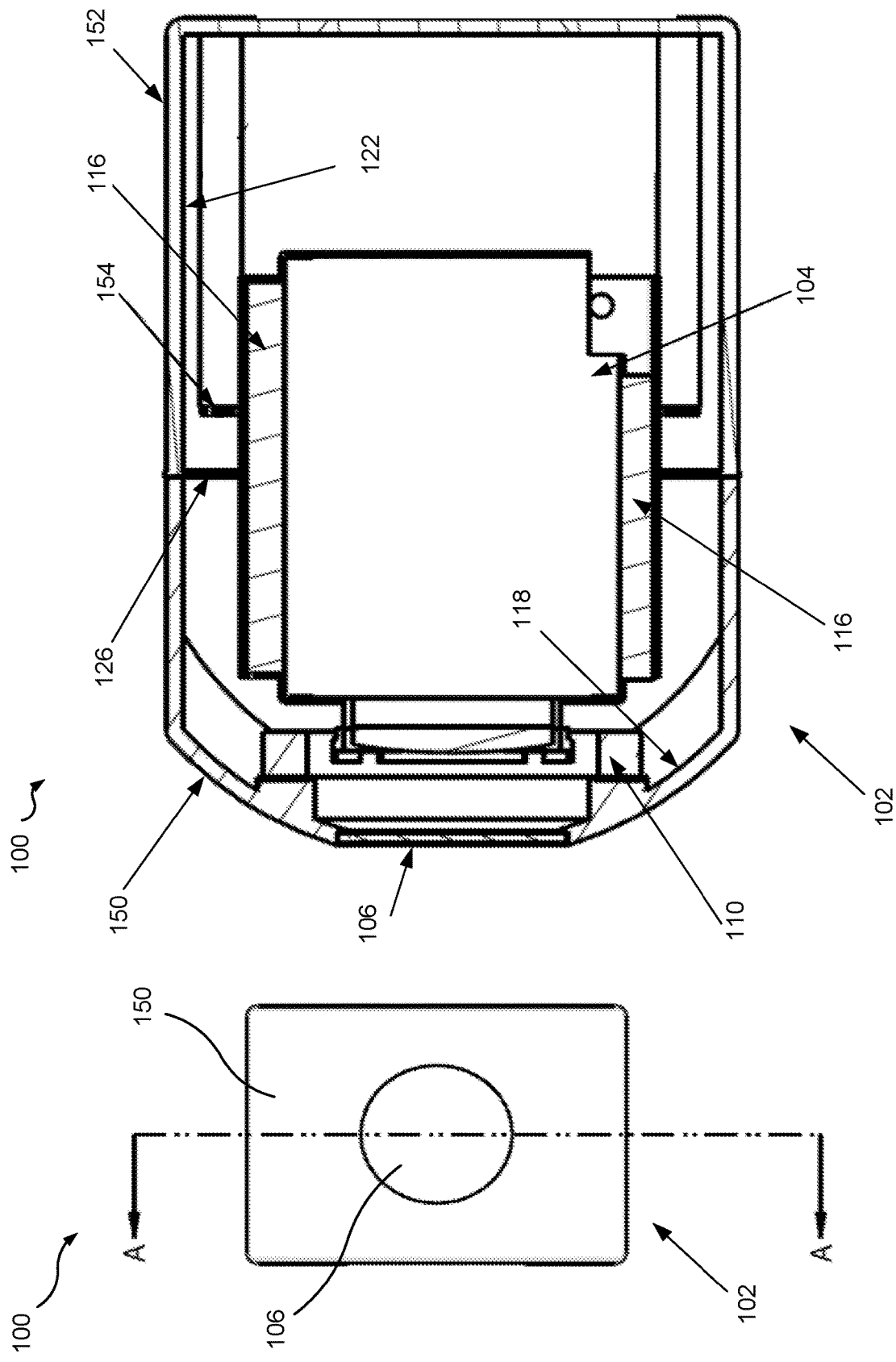
FIG. 5 is a front view of an example implementation of the sensor system of FIG. 1 configured as a fixed outdoor box or bullet camera.
FIG. 6 is a cross-sectional view of the example implementation of FIG. 5 along line A-A of FIG. 5.
Figure 7:
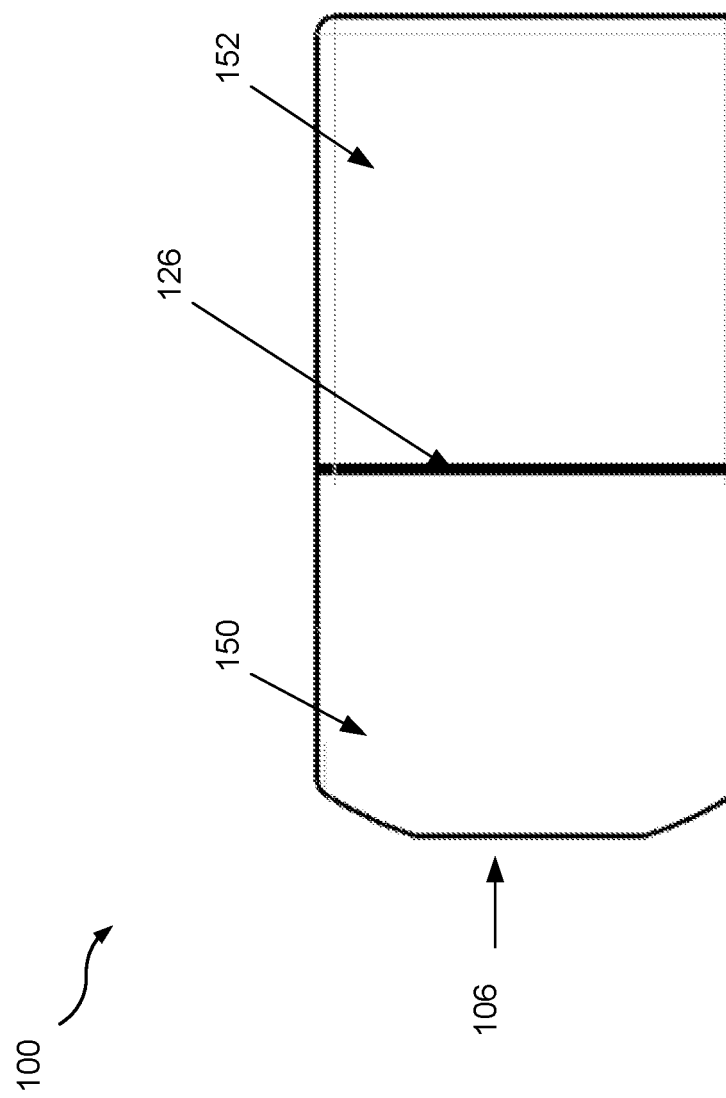
FIG. 7 is a side view of the example implementation of FIG. 5.

Referring to FIGS. 5-7 (where all of the referenced features are visible in FIG. 6, and FIGS. 5 and 7 providing supplementary views of select features), in another non-limiting implementation, the sensor system 100 may be a fixed outdoor box or bullet camera in which the housing 102 includes a front cover 150 and a rear cover 152. The transparent window 106, which may be planar, is bonded to the front cover 150. The sensor device 104, which is also a camera in this case, is mounted on a mounting frame 154 attached to the inner wall 122 of the rear cover 152. The sensor device 104 is at least partially vibrationally isolated by the damping members 116 from the mounting frame 154, and thereby from the rear cover 152, and thereby from the front cover 150. The vibration device 110, which may include an ultrasonic or electro-magnetic transducer, is bonded to the internal wall 118 of the front cover 150 adjacent to the transparent window 106. The front cover 150 may be attached to the rear cover 152 by the damping member 126 configured to provide at least partial vibration isolation between the front cover 150 and the rear cover 152, thereby at least partially vibrationally isolating the vibration device 110 and the transparent window 106 from the sensor device 104. The damping member 126 may further be configured as an environmental seal to protect the inside of the housing 102 against environmental contaminants.

The ultrasonic cleaning functionality provided by the present aspects is applicable to large camera blocks as well as small and/or micro cameras and lenses.

Figure 8:
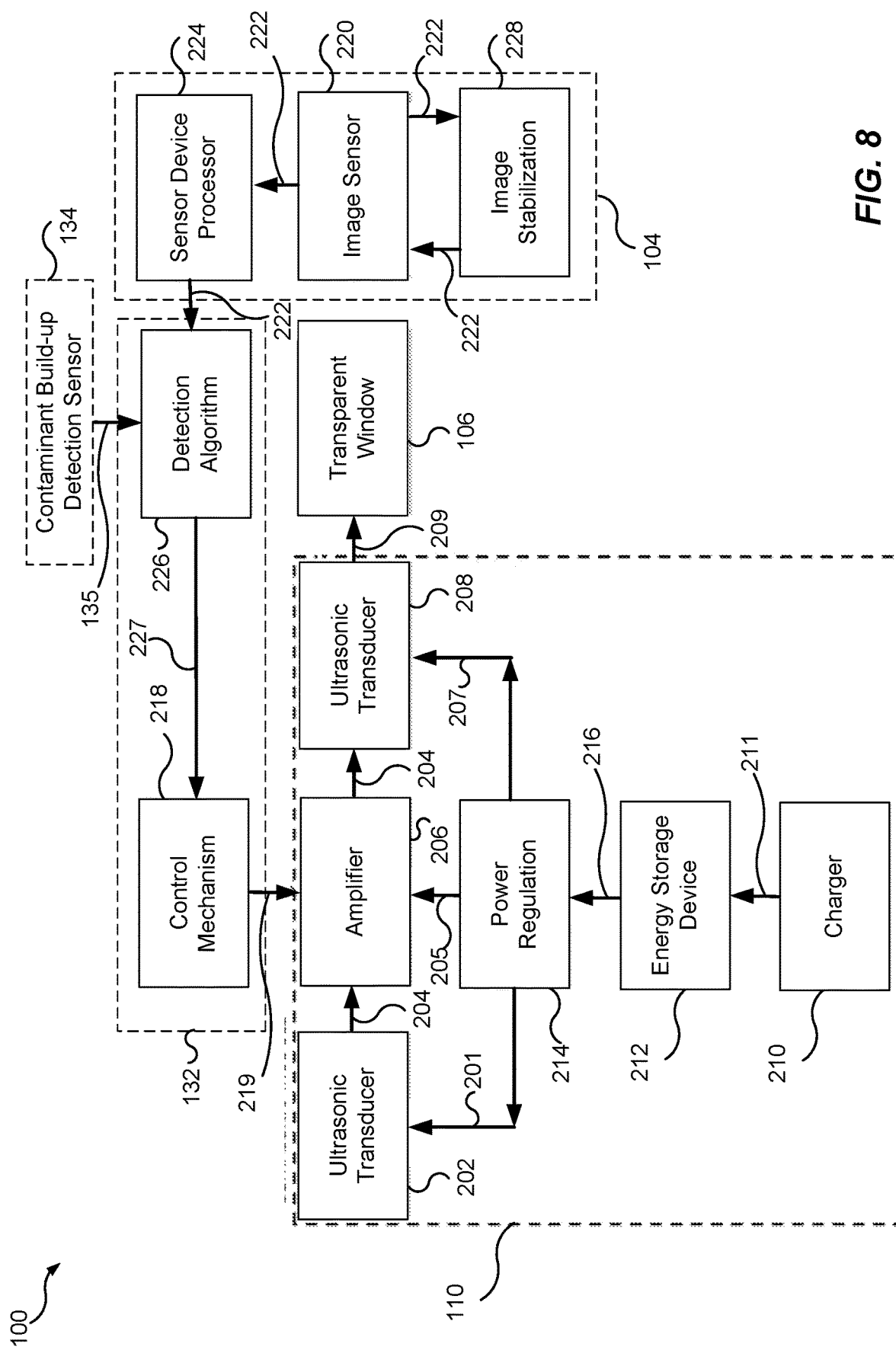
FIG. 8 is a block diagram of the example sensor system of FIG. 1.

Referring to FIG. 8. in some aspects, the controller 132 in the sensor system 100 implements software control modules configured to control the ultrasonic power and/or frequency of the vibration device 110 for cleaning the transparent window 106. For example, in one non-limiting aspect, the vibration device 110 may include a signal generator 202 controlled by the controller 132 to generate electrical signals 204 that cause an ultrasonic transducer 208 to generate kinetic movement 209 in the ultrasonic frequency range (e.g., greater than 20 kHz) to create a corresponding movement in the transparent window 106. The electrical signals 204 may be amplified by a variable gain amplifier 206 controlled by the controller 132 to drive the ultrasonic transducer 208 in the vibration device 110. In some aspects, the ultrasonic transducer 208 may be a mechanical or piezo-electrical transducer depending on the mass of the load to be driven, i.e., at least the transparent window 106. The ultrasonic transducer 208 converts the electrical signals 204 into the kinetic movement 209, which is transferred to the transparent window 106, causing a kinetic movement of the transparent window 106. In an implementation, the ultrasonic transducer 208 may be mechanically bonded to the transparent window 106 of the sensor system 100. In an aspect, for example, such bonding allows the kinetic movement 209 generated by the ultrasonic transducer 208 to move the transparent window 106 at a controllable sonic frequency and at a desired power controllable by the controller 132. In an aspect, the movement 209 of the ultrasonic transducer 208 may be configured to cause movement or vibration of the transparent window 106 at one or more resonant frequencies, such as a natural frequency, of the transparent window 106 or of the combination of the transparent window 106 and the housing 102 (FIG. 1).

In some aspects, the vibration device 110 is configured and controlled by the controller 132 such that the vibrations induced to the transparent window 106 do not cause cavitation that can erode the outer surface 120 (FIG. 1) of the transparent window 106. For example, in an aspect, the energy of the kinetic movement 209 of the ultrasonic transducer 208 is limited by the controller 132 to a maximum value to prevent cavitation of the transparent window 106. Alternatively and/or additionally, the ultrasonic transducer 208 may be activated by the controller 132 only for a maximum burst duration and/or only until it is determined by the controller 132 that the transparent window 106 has been sufficiently cleaned, based on, for example, continuous sensor detection of the contaminant build-up severity, as described below.

In some aspects, the damping members 116 and/or 126 (FIG. 1) isolate the micro-mechanical elements of the sensor device 104 (FIG. 1) and the lens assembly 108 (FIG. 1), such as the micro-mechanical motors used to zoom the lens, and/or the rotatable joints 114, 115, from the sonic vibrations of the transparent window 106 caused by the kinetic movement 209 of the ultrasonic transducer 208.

In some aspects, the sensor system 100 may further include a designated electronic power supply for driving the vibration device 110 so that the power used by the vibration device 110 does not affect the overall power budget associated with other functionalities of the sensor system 100. For example, a power storage device 212 in the sensor system 100 may drive the vibration device 110 in short bursts (e.g., 1-2 seconds) so that the nominal power demand of the sensor system 100 is least affected by the operation of the vibration device 110.

In some aspects, the vibration device 110 may be powered by the main power supply mechanism of the sensor system 100, e.g., by POE, POE+, POE++, etc., as opposed to requiring a separate power supply and/or power cable. In an aspect, in order to ensure that conventional/existing infrastructure and cabling can be used to power both the sensor system 100 and the vibration device 110, a trickle-charge mechanism may be implemented to use the main power supply of the sensor system 100 to slowly trickle-charge the power storage device 212 in the vibration device 110. In an aspect, the power storage device 212 may be, for example, a super capacitor or a lithium-ion battery. Once charged, the power storage device 212 may be used to drive various components of the vibration device 110 in response to activation of the ultrasonic cleaning functionality by the controller 132. In some aspects, the vibration device 110 may include an electrical power charger 210 driven by the main power source of the sensor system 100 to output an electrical power 211 to charge the power storage device 212. An electrical power 216 output by the power storage device 212 may then undergo power regulation 214 to output respective electrical powers 201, 205, 207 to drive various components of the vibration device 110, such as the signal generator 202, the amplifier 206, and the ultrasonic transducer 208. For example, the power regulation 214 may include, for example, a linear power regulator or a switch mode power regulator, in a buck, boost, or buck-boost configuration, depending on the power requirements of the system.

In some aspects, the frequency and/or amplitude of the electrical signals 204 that drive the ultrasonic transducer 208 may be adjusted by a control mechanism 218 in the controller 132. In an aspect, the control mechanism 218 is configured to output control signals 219 to control the operation of the vibration device 110 so as to tune the electrical signals 204 and the resulting kinetic movement 209, e.g., the frequencies and/or amplitudes and/or duration of the vibrations, of the ultrasonic transducer 208 based on a type and/or severity of contaminant build-up on the transparent window 106. In an aspect, the control mechanism 218 may perform all or a subset of: determining if cleaning is required, determining ultrasonic frequency/gain and time settings for the vibration device 110, activating the vibration device 110, determining if the transparent window 106 has been cleaned, and deactivating the vibration device 110, as described below.

In an aspect, for example, the controller 132 may include a scheduled timer set by an operator of the sensor system 100 to routinely clean the transparent window 106 at preselected time intervals. Alternatively and/or additionally, the controller 132 may receive signals 135 from the dedicated contaminant build-up detection sensor 134, such as an infra-red (IR) sensor, to determine contaminant build-up type/severity based on the reflectivity and/or the ambient light level through the transparent window 106. In an aspect, the contaminant build-up detection sensor 134 may be implemented in the sensor system 100, for example, if there is not sufficient processing power within the sensor device 104 to make satisfactory contaminant build-up determination as described in the alternative aspect below.

Alternatively and/or additionally, an image sensor 220 in the sensor device 104 may be used to monitor the level of contaminant build-up on the transparent window 106 over time. For example, a software detection algorithm 226 in the controller 132 may process images 222 produced by the image sensor 220 to determine if contaminant build-up on the transparent window 106 has reached a level that requires cleaning. The images 222 may also be used to determine the type of contaminant on the transparent window 106, e.g., water, snow, etc. For example, in an aspect, the detection algorithm 226 may determine contaminant build-up type and/or severity by determining whether the images 222 indicate a reflection from the transparent window 106 back at the sensor device 104. Alternatively and/or additionally, the detection algorithm 226 may determine contaminant build-up type and/or severity based on a level of sharpness of the images 222. For example, when the transparent window 106 is initially clean, or just after being cleaned, the sensor device 104 may obtain a reference target image of a subject, e.g., a building sign illuminated at night or a fixed image in the field of view of the sensor device 104, and then compare later-obtained images 222 with the reference image to determine a relative sharpness indicative of contaminant build-up.

Alternatively and/or additionally, the detection algorithm 226 may determine contaminant build-up type and/or severity by applying an image processing, a pattern processing, or another similar technique to the images 222. Alternatively and/or additionally, the detection algorithm 226 may determine contaminant build-up type and/or severity by comparing the images 222 to previously-obtained and stored images. Alternatively and/or additionally, the detection algorithm 226 may make such determinations optionally in combination with other information such as network-provided weather information, historical seasonal weather information, external ambient temperature/humidity readings from other sensors on the housing 102 (FIG. 1), etc., to determine the contaminant build-up type and/or severity. Accordingly, by continuously/periodically and automatically examining and cleaning the transparent window 106, the sensor device 104 may consistently produce high quality sharp imagery over an extended period of time.

After the detection algorithm 226 determines the type and/or severity of contaminant build-up, the control mechanism 218 may adjust the vibration frequency and/or level and/or timing of the vibration device 110 accordingly to clear the detected contaminant build-up in a fast and efficient way. For example, the control mechanism 218 may cause the signal generator 202 and/or the amplifier 206 to generate one or more of a plurality of different electrical signals 204 to cause the vibration device 110 to generate one or more of a plurality of different kinetic movements 209 (also referred to as modes of operation), where each of the plurality of different kinetic movements 209 may be designed to cause corresponding movement in the transparent window 106 to displace one or more of a plurality of different types and/or weights of contaminants.

More specifically, in one aspect, for example, the control mechanism 218 may control the vibration device 110 based on feedback from the sensor device 104 in the sensor system 100. For example, the image sensor 220 in the sensor device 104 may produce images 222 at a given frame rate determined by the sensor device 104. The images 222 may be initially processed by a processor 224 in the sensor device 104, and then input to the detection algorithm 226 for detecting contaminant build-up type and/or severity on the outer surface 120 (FIG. 1) of the transparent window 106 based on the images 222. The detection algorithm 226 may be applied to each successive image 222 received from the processor 224. If the detection algorithm 226 determines that there is not enough contaminant build-up on the transparent window 106, there is no need to activate the ultrasonic transducer 208 in the vibration device 110. Alternatively, if the detection algorithm 226 determines that there is enough contaminant build-up on the transparent window 106, then the ultrasonic transducer 208 in the vibration device 110 needs to be activated. In this case, the detection algorithm 226 sends a cleaning trigger 227 including information about the type and/or severity of the contaminant build-up to the control mechanism 218.

The control mechanism 218 compares the contaminant build-up type and/or severity values against a lookup table to determine appropriate frequency and gain settings for the vibration device 110, and optionally also a timing required for cleaning the transparent window 106. The control mechanism 218 then sets the frequency of the signal generator 202 and the gain of the variable gain amplifier 206 according to the determined frequency and gain settings, respectively. The control mechanism 218 then enables/activates the ultrasonic transducer 208 for the determined timing required for cleaning. Alternatively and/or additionally, the control mechanism 218 enables/activates the ultrasonic transducer 208 and later deactivates the ultrasonic transducer 208 based on further input from the detection algorithm 226. Specifically, in an aspect, during the cleaning of the transparent window 106, the processor 224 may continue to pass the images 222 to the detection algorithm 226. Once the detection algorithm 226 determines that the transparent window 106 is sufficiently clear based on the images 222, the control mechanism 218 may disable/deactivate the ultrasonic transducer 208. In an aspect, the aforementioned cycle of detection, activation, and de-activation may be repeated indefinitely.

In some alternative and/or additional aspects, after the vibration device 110 is activated to clear contaminants from the transparent window 106, the detection algorithm 226 may provide further information to the control mechanism 218, for example, to adjust the frequency of the signal generator 202 and/or the gain of the amplifier 206 in the vibration device 110 based on the progress in cleaning the transparent window 106. For example, after the control mechanism 218 activates the vibration device 110, the detection algorithm 226 may determine an updated value of contaminant build-up based on further images 222. If the contaminant build-up has not been sufficiently reduced after a certain amount of time, the control mechanism 218 may adjust the settings of the vibration device 110 accordingly. For example, the control mechanism 218 may determine after a certain amount of time that the transparent window 106 is not sufficiently cleaned and may then increase the frequency of the signal generator 202 and/or the gain of the amplifier 206 in the vibration device 110 in the vibration device 110 to more aggressively clean the transparent window 106. Alternatively, the control mechanism 218 may determine after a certain amount of time that the transparent window 106 is cleaned sooner than anticipated and may then decrease the frequency of the signal generator 202 and/or the gain of the amplifier 206 in the vibration device 110 to preserve power and/or reduce potential damage to the outer surface 120 (FIG. 1) of the transparent window 106 and/or increase the expected life of various components of the sensor system 100.

In some aspects, for example, during a rainstorm event as indicated by contaminant build-up or by any other data received by the sensor system 100, the control mechanism 218 may activate the vibration device 110 intermittently and as-needed. For example, the control mechanism 218 may first activate the vibration device 110 and subsequently determine that the contaminant build-up on the transparent window 106 has been sufficiently reduced. The control mechanism 218 may then de-activate the vibration device 110 and start a timer to schedule re-activation of the vibration device 110 after a certain amount of time in which the rainstorm event is predicted to cause further contaminant build-up. The indication of the rainstorm event may be based on the images 222 and/or based on other data, for example, data from ambient sensors associated with the sensor system 100 and/or data received by the sensor system 100 via a wired or wireless communication network connection.

In an aspect, the control mechanism 218 may select a mode of operation of the vibration device 110 based on the contaminant type detected by the detection algorithm 226. For example, in an aspect, a first mode of operation may be selected when the contaminant type is water, and a second/different mode of operation may be selected when the contaminant type is ice. Each mode of operation may indicate a corresponding vibration frequency, a corresponding vibration power, and/or a corresponding duration of vibration of the vibration device 110. Alternatively and/or additionally, the control mechanism 218 may select the mode of operation of the vibration device 110 further based on the contaminant build-up severity detected by the detection algorithm 226. For example, a first mode of operation selected for a relatively thick contaminant build-up may indicate a higher vibration frequency, a higher vibration power, and/or a longer cleaning duration as compared to a second mode of operation selected for a relatively thinner contaminant build-up. In an aspect, various modes of operation of the vibration device 110 and their corresponding selection criteria/conditions may be pre-determined and may be stored in the sensor system 100, for example, in a memory 304 as described below with reference to FIG. 3. In an aspect, such stored modes of operation and their corresponding selection criteria/conditions may be adjusted by an operator of the sensor system 100. Alternatively and/or additionally, such stored modes of operation and their corresponding selection criteria/conditions may be automatically adjusted over time by the control mechanism 218 based on monitoring the cleaning progress resulting from such stored modes of operation. For example, In an aspect, for example, the control mechanism 218 may apply a learning algorithm to adjust the stored modes of operation based on their cleaning results.

In some aspects, the sensor device 104 may apply software-driven image stabilisation 228 to the images 222, in particular, when the vibration device 110 is activated. Further, the damping members 116 and/or 126 (FIG. 1) mechanically decouple the vibration device 110 and/or the transparent window 106 from the sensor device 104. As such, the damping members 116 and/or 126 (FIG. 1) prevent movements of the sensor device 104 that may result in an unstable image during cleaning of the transparent window 106. This mechanical de-coupling, optionally in addition to the software-driven image stabilisation 228, ensures that stable images 222 are obtained while the transparent window 106 is being cleaned by activation of the vibration device 110.

In an aspect, the vibration device 110 may be configured as an ultrasonic motor ring surrounding the transparent window 106. In an aspect, the vibration device 110 may move/vibrate/shake the transparent window 106 in a piston-like action. In an aspect, for example, the transparent window 106 may be a planar window, and the piston-like movement may be in a direction substantially normal to the outer surface 120 (FIG. 1) of the planar transparent window 106. Accordingly, the piston-like movement of the planar transparent window 106 in the direction normal to the outer surface 120 (FIG. 1) of the planar transparent window 106 may have no effect on the images 222 obtained by the sensor device 104. That is, due to its normal direction, such movement may not disturb/degrade the images 222 obtained by the sensor device 104. Further, such movement may not be noticeable from the outside of the sensor system 100.

In some alternative and/or additional aspect, the vibration devices 110 may be positioned at one or more points around the transparent window 106, such as, for example, above and below a centre line of the transparent window 106. In some alternative and/or additional aspects, the vibration devices 110 may be integrated into a coil that surrounds a perimeter of the transparent window 106 and adjoins the transparent window 106 to the opening 130 in the housing 102. In an aspect, the vibration device 110 effectively turns the transparent window 106 into a sonic speaker.

In one non-limiting aspect, for example, the ultrasonic transducer 208 is configured to move the transparent window 106 between a first position and a second position that are apart by 1 mm or less. The power consumed by the vibration device 110 may be, for example, ~5 W at 24 V, to trickle-charge the power storage device 212 in the vibration device 110. The ultrasonic transducer 208 may be a piezoelectric crystal transducer, a motor piston, or any other ultrasonic generator applicable. In an aspect, the ultrasonic transducer 208 may include one or more raw piezo-electric discs or blocks built into the opening 130 in the housing 102. In an aspect, the ultrasonic transducer 208 may include one or more ceramic-encapsulated piezo stacks. In some aspects, the ultrasonic transducer 208 may be operable, for example, at 30-40 kHz free standing. However, the mass and seals of the transparent window 106 may change the operating frequency of the ultrasonic transducer 208 from ultrasonic down to sonic, e.g., 10-15 kHz. In an aspect, the control mechanism 218 activates the ultrasonic transducer 208 only for short bursts or pulses. In an aspect, the control mechanism 218 activates the ultrasonic transducer 208 in a way to avoid cavitation that causes micro holes on the outer surface 120 of the transparent window 106. In an aspect, activation of the ultrasonic transducer 208 may cause contaminants such as water droplets to bounce off the outer surface 120 of the transparent window 106, irrespective of the orientation of the sensor system 100.

In some aspects, the sensor system 100 may implement a heating mechanism in combination with the ultrasonic cleaning functionality of the vibration device 110, for example, for faster and/or more efficient removal of contaminants such as ice, snow, sleet, etc.

In some alternative and/or additional aspects, the vibration device 110 may be augmented by or replaced with an electromagnetic vibration module that implements an electromagnetic vibrator. Alternatively and/or additionally, the vibration device 110 may be augmented by or replaced with any other applicable vibration mechanism/module.

In some aspects, the sensor system 100 may be calibrated to achieve efficient cleaning of the transparent window 106 with the least power consumption for driving the vibration device 110, for example, by appropriate selection of the cleaning vibration period, power, and/or frequency, which may depend on the size/mass of the transparent window 106 and/or the expected contaminant type/severity. In one aspect, for example, a frequency range may be associated with each sensor system model at design time. Then, for each individual sensor system 100, an eventual optimum operating frequency within the corresponding designed frequency range may be selected during calibration.

As such, the present aspects provide an efficient, long-term, and "non-contact" or "touch-less" cleaning functionality for cleaning the transparent window 106.

Figure 9:
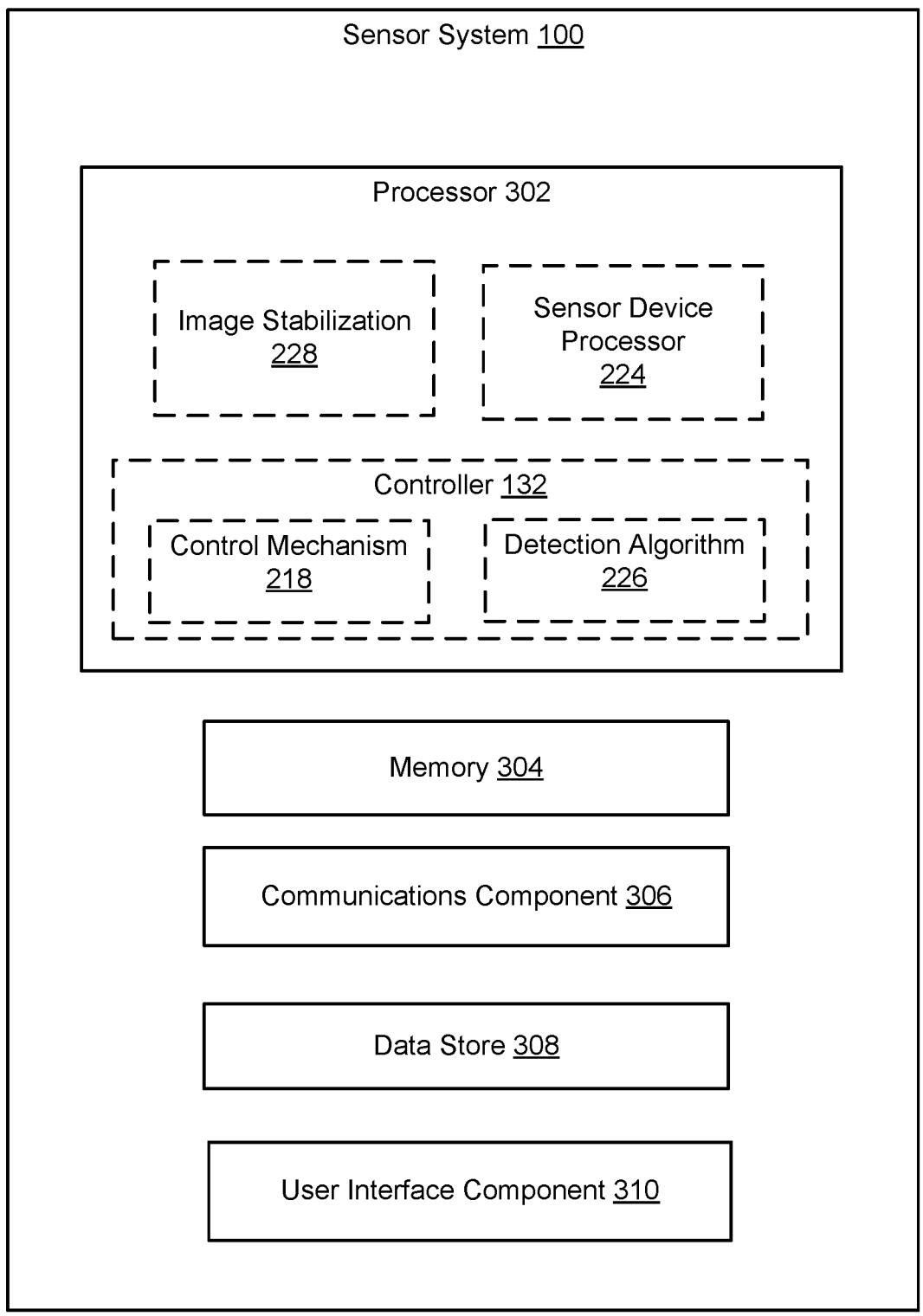
FIG. 9 is a block diagram of example computing components of the example sensor system of FIG. 1.

FIG. 9 illustrates an example block diagram providing details of computing components in the sensor system 100 to perform any functionalities described herein with reference to ultrasonic cleaning of the transparent window 106 (FIG. 1). The sensor system 100 includes a processor 302 which may be or may include the sensor device processor 224 configured to control the imaging functionality of the sensor device 104 to obtain and process the images 222 (FIG. 8) used for controlling the vibration device 110 (FIG. 8). Alternatively and/or additionally, the processor 302 may further be, include, or implement the controller 132 configured to execute the detection algorithm 226 for detecting the type and/or severity of contaminant build-up on the transparent window 106 based in the images 222. The controller 132 may further be configured to execute the control mechanism 218 for determining gain, frequency, and/or activation time of the vibration device 110 based on the output of the detection algorithm 226. The controller 132 may further be configured to control various components of the vibration device 110 (FIG. 8) based on the output of the control mechanism 218. For example, the controller 132 may further be configured to set the frequency of the signal generator 202 (FIG. 8) and the gain of the amplifier 206 (FIG. 8) based on the frequency and gain determined by the control mechanism 218, and activate the ultrasonic transducer 208 (FIG. 8) for the activation time determined by the control mechanism 218 or until determining that the transparent window 106 (FIG. 8) has been cleaned.

The processor 302 may be a micro-controller, an application-specific integrated circuit (ASIC), or a field-programmable gate array (FPGA), and/or may include a single or multiple set of processors or multi-core processors. Moreover, the processor 302 may be implemented as an integrated processing system and/or a distributed processing system. The sensor system 100 may further include the memory 304, such as for storing local versions of applications being executed by the processor 302, related instructions, parameters, etc. The memory 304 may include a type of memory usable by a computer, such as random access memory (RAM), read only memory (ROM), tapes, magnetic discs, optical discs, volatile memory, non-volatile memory, and any combination thereof. Additionally, the processor 302 and the memory 304 may include and execute an operating system executing on the processor 302, one or more applications, display drivers, etc., and/or other components of the sensor system 100.

Further, the sensor system 100 may include a communications component 306 that provides for establishing and maintaining communications with one or more other devices, parties, entities, etc. utilizing hardware, software, and services. The communications component 306 may carry communications between components on the sensor system 100, as well as between the sensor system 100 and external devices, such as devices located across a communications network and/or devices serially or locally connected to the sensor system 100. For example, the communications component 306 may include one or more buses, and may further include transmit chain components and receive chain components associated with a wireless or wired transmitter and receiver, respectively, operable for interfacing with external devices.

Additionally, the sensor system 100 may include a data store 308, which can be any suitable combination of hardware and/or software, that provides for mass storage of information, databases, and programs. For example, a data store 308 may be or may include a data repository for applications and/or related parameters not currently being executed by processor 302. In addition, the data store 308 may be a data repository for an operating system, application, display driver, etc., executing on the processor 302, and/or one or more other components of the sensor system 100.

The sensor system 100 may also include a user interface component 310 operable to receive inputs from a user of the sensor system 100 and further operable to generate outputs for presentation to the user (e.g., via a display interface to a display device). The user interface component 310 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 310 may include one or more output devices, including but not limited to a display interface, a speaker, a haptic feedback mechanism, a printer, any other mechanism capable of presenting an output to a user, or any combination thereof.

Figure 10:
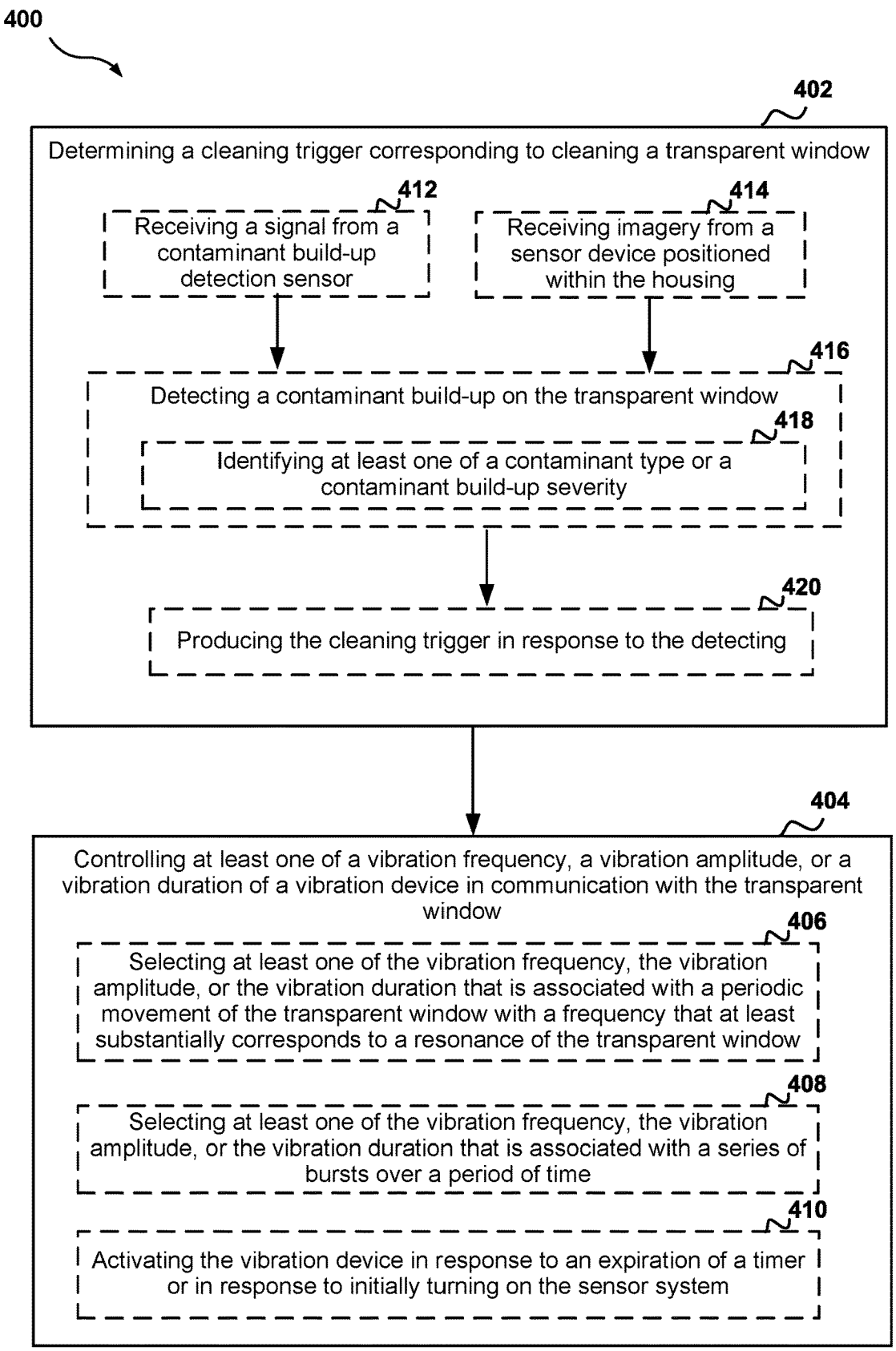
FIG. 10 is a flowchart of a method of cleaning the transparent window in the housing of the example sensor system of FIG. 1.

FIG. 10 is a flowchart of a method 400 of operation of the sensor system 100. The method 400 may be performed by one or more components of the sensor system 100 as described herein with reference to FIGS. 1-9.

At 402 the method 400 may include determining a cleaning trigger corresponding to cleaning a transparent window mounted within an opening defined by at least one internal wall of a housing of the sensor system. For example, in an aspect, the detection algorithm 226 in the controller 132 of the sensor system 100 may determine the cleaning trigger 227 corresponding to cleaning the transparent window 106 mounted within the opening 130 defined by at least one internal wall 118 of the housing 102 of the sensor system 100. In an aspect, the detection algorithm 226 may send the cleaning trigger 227 to the control mechanism 218 to activate ultrasonic cleaning functionality via the vibration device 110, as described herein with reference to various aspects.

At 404 the method 400 may further include controlling, in response to the cleaning trigger, at least one of a vibration frequency, a vibration amplitude, or a vibration duration of a vibration device of the sensor system, where the vibration device is in communication with the transparent window, and where the controlling causes the vibration device to produce a first sonic movement that causes the transparent window to movably respond with a second sonic movement. For example, in an aspect, the control mechanism 218 may send the control signals 219 to control, in response to the cleaning trigger 227, at least one of a vibration frequency, a vibration amplitude, or a vibration duration of the vibration device 110 of the sensor system 100, where the vibration device 110 is in communication with the transparent window 106, and where the control signals 219 cause the vibration device 110 to produce a first sonic movement 209 that causes the transparent window 106 to movably respond with a second sonic movement.

Optionally, the controlling at block 404 may include block 406, and at block 406 the method 400 may further include selecting at least one of the vibration frequency, the vibration amplitude, or the vibration duration that is associated with a periodic movement of the transparent window with a frequency that at least substantially corresponds to a resonance of the transparent window. For example, in an aspect, the control mechanism 218 may select at least one of a vibration frequency, a vibration amplitude, or a vibration duration of the vibration device 110 of the sensor system 100 that is associated with a periodic movement of the transparent window 106 with a frequency that at least substantially corresponds to a resonance of the transparent window 106.

Optionally, the controlling at block 404 may include block 408, and at block 408 the method 400 may further include selecting at least one of the vibration frequency, the vibration amplitude, or the vibration duration that is associated with a series of bursts over a period of time. For example, in an aspect, the control mechanism 218 may select at least one of a vibration frequency, a vibration amplitude, or a vibration duration of the vibration device 110 of the sensor system 100 that is associated with a series of bursts over a period of time.

Optionally, the controlling at block 404 may include block 410, and at block 410 the method 400 may further include activating the vibration device in response to an expiration of a timer or in response to initially turning on the sensor system. For example, in an aspect, the control mechanism 218 may send the control signals 219 to activate the vibration device 110 in response to an expiration of a timer or in response to initially turning on the sensor system 100.

Optionally, the determining at block 402 may include block 412, and at block 412 the method 400 may further include receiving a signal from a contaminant build-up detection sensor of the sensor system. For example, in an aspect, the detection algorithm 226 may receive a signal 135 from the contaminant build-up detection sensor 134 of the sensor system 100.

Optionally, alternatively and/or additionally, the determining at block 402 may include block 414, and at block 414 the method 400 may further include receiving imagery from a sensor device positioned within the housing and having a sensor input aligned with the transparent window. For example, in an aspect, instead of or in addition to the signal 135 from the contaminant build-up detection sensor 134, the detection algorithm 226 may receive the images 222 from the sensor device 104 positioned within the housing 102 and having a sensor input aligned with the transparent window 106.

Optionally, the determining at block 402 may include block 416, and at block 416 the method 400 may further include detecting a contaminant build-up on the transparent window based on the signal from the contaminant build-up detection sensor and/or based on the imagery. For example, in an aspect, the detection algorithm 226 may detect a contaminant build-up on the transparent window 106 based on the signal 135 from the contaminant build-up detection sensor 134 and/or based on the images 222 from the sensor device 104. Optionally, in an aspect, the contaminant build-up detection sensor 134 may include an IR sensor.

Optionally, the detecting at block 416 may include block 418, and at block 418 the method 400 may further include identifying at least one of a contaminant type or a contaminant build-up severity based on the imagery. For example, in an aspect, the detection algorithm 226 may identify at least one of a contaminant type or a contaminant build-up severity based on the images 222.

Optionally, the determining at block 402 may include block 420, and at block 420 the method 400 may further include producing the cleaning trigger in response to the detecting. For example, in an aspect, the detection algorithm 226 may produce the cleaning trigger 227 in response to the detecting.

As disclosed, the present aspects provide a sensor system 100 including: a housing 102 having at least one internal wall 118 defining an opening 130; a transparent window 106 mounted within the opening 130; a sensor device 104 positionable within the housing 102 and having at least one of a sensor output or a sensor input alignable with the transparent window 106; a vibration device 110 in communication with the transparent window 106 and controllable to produce a first sonic movement 209; where the transparent window 106 is movably responsive to the first sonic movement 209 with a second sonic movement; and at least one damping member 116 and/or 126 located between the transparent window 106 and the sensor device 104, where the at least one damping member 116 and/or 126 substantially isolates the sensor device 104 from at least the second sonic movement of the transparent window 106.

Optionally, the at least one damping member 116 is positioned between the housing 102 and the sensor device 104, and the at least one damping member 116 further substantially isolates the sensor device 104 from the first sonic movement of the vibration device 110.

Optionally, the at least one damping member 126 is positioned between the housing 102 and the transparent window 106, and the at least one damping member 126 further substantially isolates the sensor device 104 from the first sonic movement of the vibration device 110.

Optionally, the second sonic movement includes a piston-like movement.

Optionally, the second sonic movement is in a direction that is substantially normal to a surface 120 of the transparent window 106.

Optionally, the second sonic movement is a periodic movement with a frequency that at least substantially corresponds to a resonance of the transparent window 106.

Optionally, the second sonic movement includes a series of bursts over a period of time.

Optionally, the vibration device 110 includes at least one of an ultrasonic transducer 208 or an electromagnetic transducer.

Optionally, the vibration device 110 includes a transducer 208 and a power storage device 212 configured to drive the transducer 208. Optionally, the power storage device 212 is configured to be trickle-charged via a power source of the sensor system 100. Optionally, the power source of the sensor system 100 includes an Ethernet cable connection, and the power storage device 212 includes at least one of a battery or a capacitor.

Optionally, the sensor system 100 further includes a control mechanism 218 configured to control at least one of a vibration frequency, a vibration amplitude, or a vibration duration of the vibration device 110. Optionally, the control mechanism 218 is configured to activate the vibration device 110 in response to an expiration of a timer or in response to initially turning on the sensor system 100.

Optionally, the sensor system 100 further includes a contaminant build-up detection sensor 134 separate from the sensor device 104, and the control mechanism 218 is configured to use an output (signal 135) of the contaminant build-up detection sensor 134 to control at least one of the vibration frequency, the vibration amplitude, or the vibration duration of the vibration device 110. Optionally, the contaminant build-up detection sensor 134 includes an IR sensor.

Optionally, the sensor system 100 further includes a contaminant detection algorithm 226 configured to produce a cleaning trigger 227 based on images 222 received from the sensor device 104, and the control mechanism 218 is configured to use the cleaning trigger 227 to control at least one of the vibration frequency, the vibration amplitude, or the vibration duration of the vibration device 110. Optionally, the cleaning trigger 227 includes at least one of an identified contaminant type or an identified contaminant build-up severity.

Optionally, the sensor system 100 further includes a positioning system configured to move the sensor system 100. Optionally, the positioning system includes at least one of a pan movement system or a tilt movement system. Optionally, the at least one damping member 116 and/or 126 is configured to substantially mechanically isolate the positioning system from at least one of the first sonic movement or the second sonic movement.

Optionally, the sensor device 104 has a fixed position relative to the housing 102 and the transparent window 106.

Optionally, the vibration device 110 includes a coil or ring around at least a portion of a perimeter of the transparent window 106.

Optionally, the vibration device 110 includes an ultrasonic motor.

Optionally, the transparent window 106 includes glass.

Optionally, the at least one damping member 116 and/or 126 includes an elastic material.

Optionally, the sensor device 104 includes a high-resolution camera.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A system comprising:
    a contaminant build-up detection sensor configured to generate an output signal indicative of a contaminant build-up on a transparent window; and
    a controller configured to:
        detect a value of contaminant build-up severity of the contaminant build-up on the transparent window and/or one of a plurality of different contaminant materials built up on the transparent window, responsive to the output signal that is generated by the contaminant build-up detection sensor;
        select one of a plurality of different types of motions, responsive to the value of contaminant build-up severity and/or a detected one of the plurality of different contaminant materials; and
        control a device to produce a first kinetic movement responsive to a selected one of the plurality of different types of motions that is selected by the controller, wherein the transparent window is movably responsive to the first kinetic movement with a second kinetic movement that comprises: a piston-like movement, a movement that is in a direction that is substantially normal to a surface of the transparent window, a periodic movement with a frequency that at least substantially corresponds to a resonance of the transparent window, and/or a series of bursts over a period of time.

2. The system of claim 1, wherein the device comprises a vibration device.

3. The system of claim 2, wherein the first kinetic movement comprises a first sonic movement, wherein the transparent window is movably responsive to the first sonic movement with a second sonic movement.

4. The system of claim 3, wherein the vibration device comprises at least one of an ultrasonic transducer, an electromagnetic transducer, an ultrasonic motor, or a coil or ring around at least a portion of a perimeter of the transparent window.

5. The system of claim 3, wherein the controller is further configured to control at least one of a vibration frequency, a vibration amplitude, or a vibration duration of the vibration device.

6. The system of claim 1, wherein the controller is further configured to activate the device in response to an expiration of a timer or in response to initially turning on the system.

7. The system of claim 1, wherein the contaminant build-up detection sensor comprises an infrared "IR" sensor.

8. The system of claim 1, wherein the contaminant build-up detection sensor comprises a camera having at least one of a sensor output or a sensor input alignable with the transparent window.

9. The system of claim 8, wherein the system further comprises a contaminant detection algorithm configured to produce a cleaning trigger based on imagery received from the camera, wherein the controller is configured to use the cleaning trigger to control at least one of a vibration frequency, a vibration amplitude, or a vibration duration of the device.

10. The system of claim 1, wherein the transparent window comprises glass.

11. The system of claim 1, wherein the plurality of different contaminant materials includes rain, snow, ice, condensation, sand, exhaust fume, soot, dust, oil mist, or sea water.

12. The system of claim 1, wherein detecting the value of contaminant build-up severity of the contaminant build-up on the transparent window and/or one of the plurality of different contaminant materials built up on the transparent window is responsive to the output signal of the contaminant build-up detection sensor and based on a reflectivity of the transparent window or an ambient light level through the transparent window.

13. The system of claim 1, wherein detecting the value of contaminant build-up severity of the contaminant build-up on the transparent window and/or one of the plurality of different contaminant materials built up on the transparent window is responsive to the output signal of the contaminant build-up detection sensor and based on whether one or more images captured by the contaminant build-up detection sensor indicate a reflection from the transparent window back at the contaminant build-up detection sensor.

14. The system of claim 1, wherein detecting the value of contaminant build-up severity of the contaminant build-up on the transparent window and/or one of the plurality of different contaminant materials built up on the transparent window is responsive to the output signal of the contaminant build-up detection sensor and based on a level of sharpness of one or more images captured by the contaminant build-up detection sensor.

15. The system of claim 1, wherein detecting the value of contaminant build-up severity of the contaminant build-up on the transparent window and/or one of the plurality of different contaminant materials built up on the transparent window is responsive to the output signal of the contaminant build-up detection sensor and based on performing image processing and/or pattern processing on one or more images captured by the contaminant build-up detection sensor.

16. The system of claim 1, wherein detecting the value of contaminant build-up severity of the contaminant build-up on the transparent window and/or one of the plurality of different contaminant materials built up on the transparent window is further based on network-provided weather information, historical seasonal weather information, and/or external ambient temperature and/or humidity readings of one or more other sensors.

17. A method comprising:
receiving, by a controller, an output signal of a contaminant build-up detection sensor, wherein the output signal is indicative of a contaminant build-up on a transparent window;
detecting, by the controller, a value of contaminant build-up severity of the contaminant build-up on the transparent window and/or one of a plurality of different contaminant materials built up on the transparent window, responsive to the output signal that is generated by the contaminant build-up detection sensor;
selecting, by the controller, one of a plurality of different types of motions, responsive to the value of contaminant build-up severity and/or a detected one of the plurality of different contaminant materials; and
controlling, by the controller, a device to produce a first kinetic movement responsive to a selected one of the plurality of different types of motions that is selected by the controller, wherein the transparent window is movably responsive to the first kinetic movement with a second kinetic movement that comprises: a piston-like movement, a movement that is in a direction that is substantially normal to a surface of the transparent window, a periodic movement with a frequency that at least substantially corresponds to a resonance of the transparent window, and/or a series of bursts over a period of time.

18. A non-transitory computer-readable medium storing computer-executable code that when executed by a processor causes the processor to:
receive an output signal of a contaminant build-up detection sensor, wherein the output signal is indicative of a contaminant build-up on a transparent window;
detect a value of contaminant build-up severity of the contaminant build-up on the transparent window and/or one of a plurality of different contaminant materials built up on the transparent window, responsive to the output signal that is generated by the contaminant build-up detection sensor;
select one of a plurality of different types of motions, responsive to the value of contaminant build-up severity and/or a detected one of the plurality of different contaminant materials; and
control a device to produce a first kinetic movement responsive to a selected one of the plurality of different types of motions that is selected by the processor, wherein the transparent window is movably responsive to the first kinetic movement with a second kinetic movement that comprises: a piston-like movement, a movement that is in a direction that is substantially normal to a surface of the transparent window, a periodic movement with a frequency that at least substantially corresponds to a resonance of the transparent window, and/or a series of bursts over a period of time.

* * * * *